United States Patent
Budka et al.

(10) Patent No.: US 6,330,288 B1
(45) Date of Patent: Dec. 11, 2001

(54) CODING/MODULATION SCHEME SELECTION TECHNIQUE

(75) Inventors: Kenneth Carl Budka, Marlboro; Sanjiv Nanda, Clarksburg, both of NJ (US); Hans-Peter Schefczik, Erlangen (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/238,561

(22) Filed: Jan. 28, 1999

(51) Int. Cl.[7] ............... H04K 1/02; H04L 25/03; H04L 25/49
(52) U.S. Cl. ............................................. 375/296
(58) Field of Search ..................... 375/295, 296, 375/135, 146; 332/123, 159; 714/786, 790, 704; 455/91, 102

(56) References Cited

U.S. PATENT DOCUMENTS

| | | | | |
|---|---|---|---|---|
| 4,744,083 | * | 5/1988 | O'Neill et al. | 714/704 |
| 5,577,087 | * | 11/1996 | Furuya | 375/377 |
| 5,982,813 | * | 11/1999 | Dutta et al. | 375/219 |
| 6,122,293 | * | 9/2000 | Frodigh et al. | 370/473 |

* cited by examiner

Primary Examiner—Stephen Chin
Assistant Examiner—Lenny Jiang
(74) Attorney, Agent, or Firm—Joseph J. Opalach

(57) ABSTRACT

In a wireless data network, such as a General Packet Radio Service (GPRS) network, a transmitter uses one of k coding/modulation schemes for transmitting data. The transmitter initially selects a coding/modulation scheme, C, as a function of carrier-to-interference ratio (C/I) measurements. The transmitter then calculates the number of blocks, B, required to transmit a number of data packets, D, using the coding/modulation scheme C. In addition, the transmitter calculates the number of blocks required to transmit the number of data packets, D, for each coding/modulation scheme that is stronger than the selected coding/modulation scheme C. The transmitter finally selects that coding/modulation scheme that results in transmitting the number of data packets D in B blocks using the strongest coding/modulation scheme. As a result, each block is transmitted using the strongest coding/modulation scheme available.

5 Claims, 2 Drawing Sheets

CODING/MODULATION SCHEME SELECTION TECHNIQUE

FIELD OF THE INVENTION

This invention relates generally to communications and, more particularly, to wireless systems.

BACKGROUND OF THE INVENTION

A number of present day wireless data networks transmit data between their base stations and mobile units in a series of fixed-length, physical layer blocks (hereafter simply referred to as a "block". Each block comprises a number of payload bits and parity bits, which are generated by a forward error correction code or coding scheme. In general adding more parity bits per block increases the number of airlink errors that can be detected and corrected.

However, having a large number of parity bits per block has an obvious downside—it decreases the number of available payload bits. As a result, wireless data networks such as General Packet Radio Service (GPRS) networks use more than one coding scheme to transmit data over the airlink. When the received signal-to-noise ratio (SNR) is high, airlink bit error rates are low. As a result, a coding scheme with a small number of parity bits may offer adequate protection. At low SNR, "stronger" codes may be needed to protect data against airlink errors since stronger codes add more parity bits to each block.

The error performance of a cellular airlink varies as mobile units move within a cell. To make most efficient use of the airlink, coding schemes are dynamically selected in response to changes in the quality of the cellular airlink. Current coding scheme selection algorithms are a function of a channel quality metric (CQM). A CQM is, e.g., a function of soft bit or soft symbol information, block or bit error rate estimates, received signal strength, and/or the carrier-to-interference ratio (C/I).

For example, with respect to C/I, for a given coding scheme, the portion of transmissions which result in block errors decreases as the C/I value of a received signal increases. Using simulation or analytical techniques, it is possible to estimate the rate at which payload bits are carried over the airlink as a function of C/f. Plots of throughput-versus-C/I curves for all coding schemes available in a wireless data network show at which values of C/I it is advantageous to switch coding schemes. An illustrative throughput-versus-C/I plot is shown in FIG. 1 for three coding schemes I, II, and III, where coding scheme I is the strongest and coding scheme III is the weakest. C/I switch points are often hard-coded at the transmitter. Based on C/I measurements, a transmitter switches to a coding scheme offering the best performance (highest throughput/lowest delays) at the estimated received C/I level.

Similar selection techniques are used in other systems, e.g. Enhanced GPRS and North American TDMA Packet Data Channel. For example, instead of, or in addition to, the channel coding rate, the modulation scheme (signal constellation size) is varied to achieve a similar tradeoff for variable C/I. Thus, in the North American TDMA Packet Data Channel, the channel coding rate is fixed (at 5/6), while the modulation scheme is switched between 4-level (DQPSK) and 8-level (coherent 8 PSK) with a possible extension to 16-level (not yet specified). In this case, schematically the same performance tradeoffs as shown in FIG. 1 apply, if we now refer to the three formats I, II, and III as three modulation schemes. (As such, as used herein, the term "coding/modulation scheme" refers to either a coding scheme, modulation scheme, or coding and modulation scheme used to transmit a signal.)

SUMMARY OF THE INVENTION

We have observed that selecting a coding/modulation scheme based on a CQM alone (e.g., C/I) does not take advantage of any spare bandwidth in a block. As such, data protection is not being maximized for a particular block. For example, payload bits are always sent in an integral number of blocks. A transmitter wishing to send one byte of payload will have to send one block regardless of which coding/modulation scheme is used. However, if selection of a coding/modulation scheme is based on CQM alone, a coding/modulation scheme with the fewest number of parity bits may be used notwithstanding the fact that spare bandwidth is available in the block. Consequently, using the code with the smallest number of parity bits both offers the lowest level of data protection and inefficient use of the airlink.

Therefore, and in accordance with the invention, a coding/modulation selection scheme takes into account CQM measurements and the volume of payload bits to be sent in a block. As a result, the strongest coding/modulation scheme for a given volume of payload bits is used.

In an embodiment of the invention, a transmitter uses one of k coding/modulation schemes in transmitting data over a wireless data network. The transmitter initially selects a coding/modulation scheme, C, as a function of C/I measurements. The transmitter then calculates the number of blocks, B, required to transmit a number of data packets, D, using the coding/modulation scheme C. In addition, the transmitter calculates the number of blocks required to transmit the number of data packets, D, for each coding/modulation scheme that is stronger than the selected coding/modulation scheme C. The transmitter finally selects that coding/modulation scheme that results in transmitting the number of data packets D in B blocks using the strongest coding/modulation scheme. As a result, each block is transmitted using the strongest coding/modulation scheme available. Thus, there will be fewer retransmissions, packet transmission delays will be lower and less variable, and achievable maximum throughputs will be higher.

DRAWINGS

DETAILED DESCRIPTION

Figure 2:
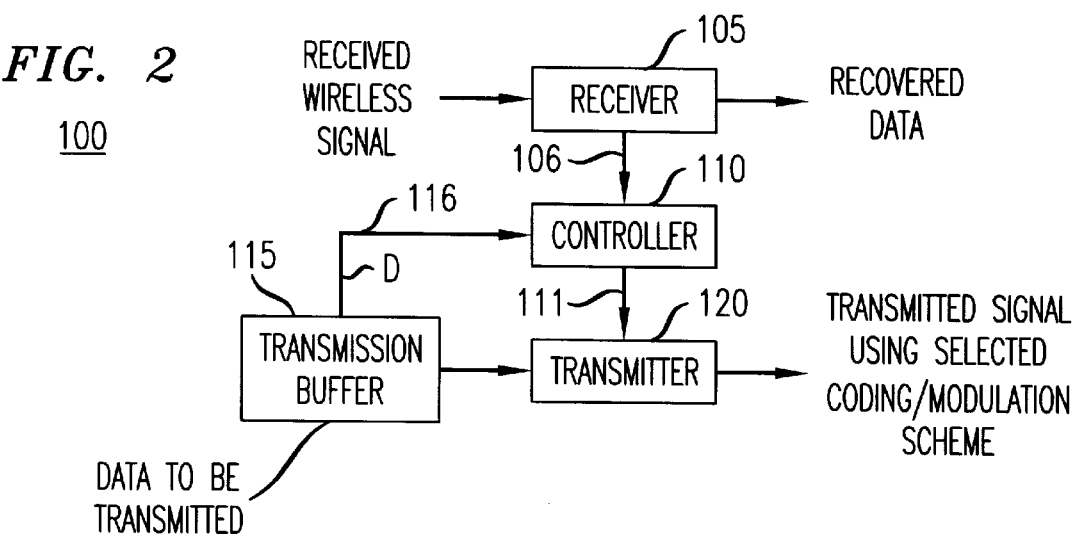
FIG. 2 shows a portion of a transmitter embodying the principles of the invention.

An illustrative block diagram of a portion of a wireless transmitter in accordance with the principles of the invention is shown in FIG. 2. Other than the inventive concept, the elements shown in FIG. 2 are well known and will not be described in detail. Similarly, the remaining portions of the wireless system such as the corresponding receivers (not shown) and other parts of the transmitter (not shown) are well known and will not be described herein.

Transmitter portion 100 comprises receiver 105, controller 110, transmission buffer 115 and transmitter 120. Receiver 105 processes a received wireless signal and provides the recovered data and a measure, or estimate, of C/I via signal 106 (as used herein, a signal is representative of any one of a number of ways for providing signaling information, e.g., hardwired serial or parallel signal paths, or via software registers (not shown) if, e.g., receiver 105 is a separate integrated circuit or a part of controller 110). Controller 110, which is illustratively a store-program-controlled microprocessor comprising memory (not shown), receives the measured C/I and a signal 116, representative of the amount of data, D, pending transmission in transmission buffer 115. In accordance with the principles of the invention, described further below, controller 110 selects a coding/modulation scheme from k available coding/modulation schemes (each coding/modulation scheme providing a different amount of error protection) such that the selected coding/modulation scheme will transmit the data D, using the maximum available protection for a given measured C/I and data D. Controller 110 controls transmitter 120 to transmit the data, D, using the selected coding/modulation scheme.

Figure 1:
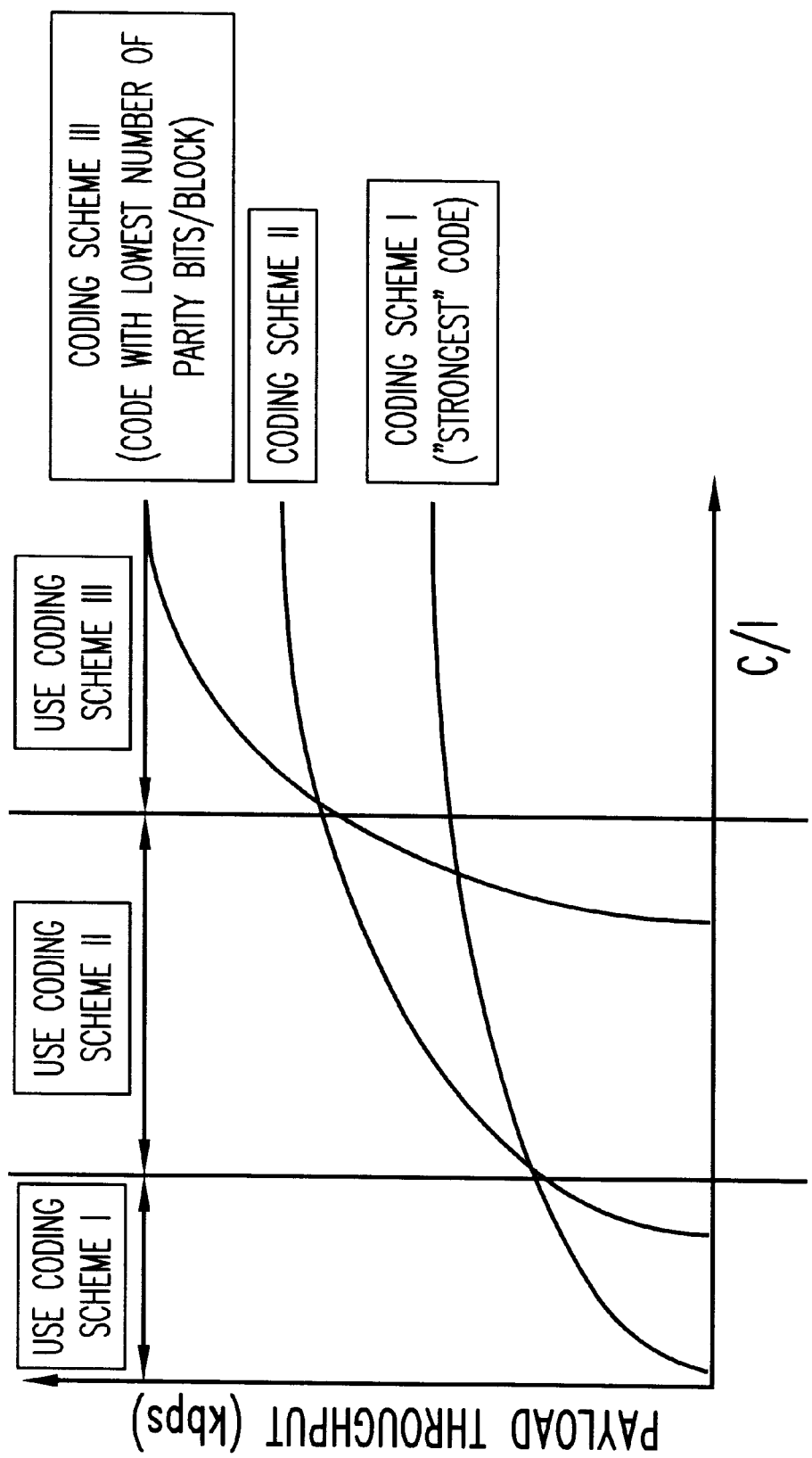
FIG. 1 is a plot of an illustrative throughput-versus-C/I curve.
Figure 3:
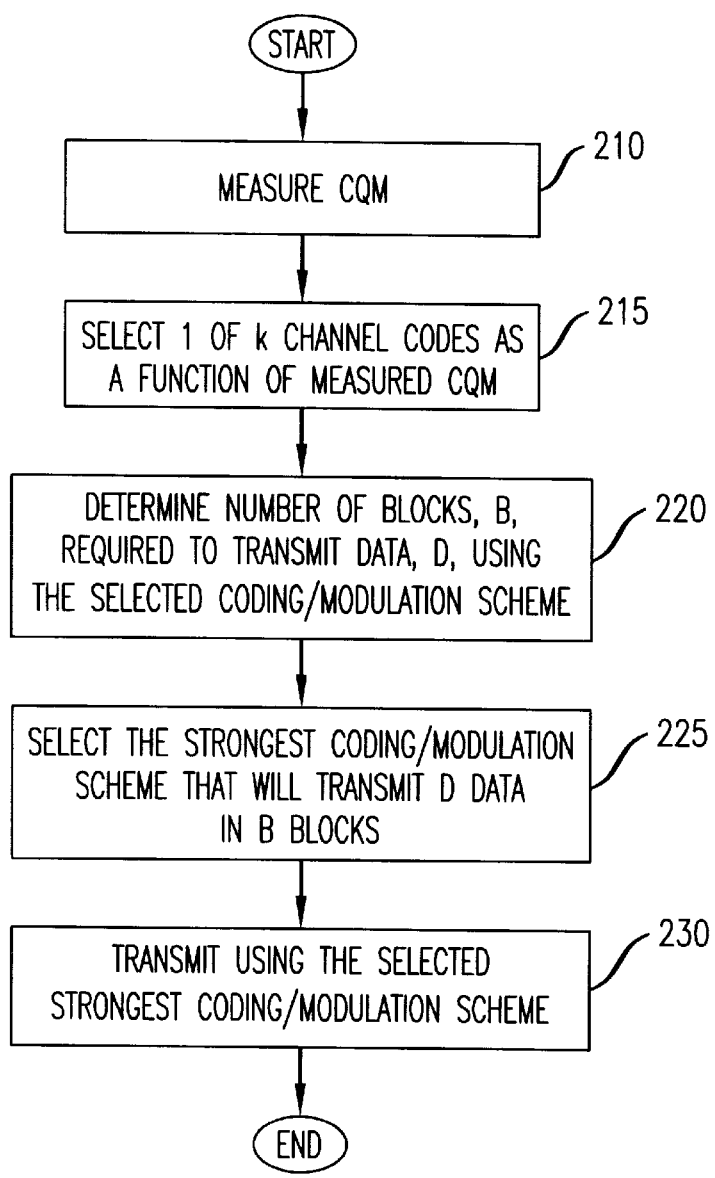
FIG. 3 shows an illustrative method embodying the principles of the invention.

Turning now to FIG. 3, a method embodying the principles of the invention for use in controller 110 is shown. In step 210, C/I is measured, or estimated by receiver 105. The measured C/I is used by controller 110 in step 215 to select code/modulation scheme C (of the k available coding/modulation schemes) that maximizes throughput at the measured C/I using the techniques of the prior art (e.g., making a selection in accordance with a throughput versus C/I curve similar to that shown in FIG. 1 for the k=3 coding/modulation schemes). Once the coding/modulation scheme C is selected, controller 110 determines, in step 220, the number of physical layer blocks, B, required to transmit a set of data packets, representing an amount of data, D, at the selected coding/modulation scheme C. In step 225, controller 110 determines the strongest coding/modulation scheme C* of the k available coding/modulation schemes that will also transmit the data, D, using the same number B of physical layer blocks. In step 230, controller 130 controls transmitter 120 to transmit the packets awaiting transmission using coding/modulation scheme C*.

It should be noted that in GPRS networks we have observed that TCP (Transmission Control Protocol) acknowledgment packets (after native TCP/IP (Internet Packet) header compression is applied by GPRS) fit into one physical layer block for all four of the coding/modulation schemes used in GPRS. TCP acknowledgment packets are likely to comprise a large portion of the data packets carried over a GPRS network. In fact a large portion of internet packets are likely to fit into one or two GPRS airlink blocks: Internet backbone measurements, for instance, indicate that roughly half the packets are 64 bytes in length or less. As such, use of the inventive concept in a GPRS network would improve the efficiency and lower the retransmission rate for a portion of the TCP/IP traffic.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., transmission buffer 115, etc., the functions of any one or more of those building blocks can be carried out using one or more appropriately programmed processors or processing circuitry, e.g., a digital signal processor; discrete circuit elements; integrated circuits; etc. Also, although the inventive concept was described in the context of C/I, any CQM could also be used.

What is claimed:

1. A method for selecting one of k coding/modulation schemes in a transmitter, the method comprising the steps of:
   (a) measuring a channel quality metric (CQM);
   (b) selecting one of the k coding/modulation schemes as a function of the measured CQM;
   (c) calculating a number of blocks, B, required to transmit a given amount of data, D, using the selected coding/modulation scheme; and
   (d) selecting the strongest coding/modulation scheme capable of transmitting as packets, the given amount of data packets D in B blocks.

2. The method of claim 1 wherein step (d) includes the step of calculating a respective number of blocks required to transmit the data D for each coding/modulation scheme that offers higher protection than the selected coding/modulation scheme.

3. The method of claim 1 wherein the transmitter is a wireless transmitter.

4. A transmitter comprising:
   receiving circuitry for use in measuring a channel quality metric (CQM);
   a processor for selecting one of k coding/modulation schemes for use in transmission of an amount of data, D;
   wherein the processor (a) selects one of the k coding/modulation schemes as a function of the measured CQM, (b) calculates a number of blocks, B, required to transmit the data, D, using the selected coding/modulation scheme, and (c) selecting the strongest coding/modulation scheme capable of transmitting as packets, the given amount of data packets D in B blocks.

5. The apparatus of claim 4, wherein the transmitter is a wireless transmitter.

* * * * *